Patented Dec. 12, 1950

2,533,696

UNITED STATES PATENT OFFICE 2,533,696

DIBORANE PURIFICATION PROCESS

George W. Schaeffer, St. Louis, Mo., and Glen D. Barbaras, Cleveland, Ohio, assignors to the United States of America as represented by the United States Atomic Energy Commission No Drawing. Application September 9, 1949, Serial No. 114,900

6 Claims. (Cl. 23—204)

This invention deals with a process for purifying diborane, and in particular for separating diborane from ethane admixed therewith.

In the production of diborane, especially from borofluoride etherate and alkali metal trimethoxyborohydride, a product is obtained which is contaminated by essential amounts of hydrocarbons. While methane, propane and other hydrocarbons may be easily removed from the diborane by distillation, the elimination of ethane is difficult due to the fact that its boiling point (−88.6° C.) is very close to that of diborane, which is −87.5° C. The removal of ethane from the diborane, however, is of great importance, because its presence makes the diborane explosive.

It is thus an object of this invention to produce a pure, nonexplosive diborane from the technical product.

It is another object of this invention to provide a process by which ethane may be readily separated from diborane.

These and other objects are accomplished by treating a diborane-ethane mixture with a pyridine whereby the diborane is complexed while the ethane remains unaffected, then removing the ethane by distillation and finally recovering the diborane from the pyridine complex by reacting it with a boron halide and separating the freed diborane.

Pyridine and substituted pyridines are suitable for the process of this invention. Examples of suitable substituted pyridines are: amyl pyridines, e. g., 2-amyl pyridine, 4-amyl pyridine; hexyl pryidines, e. g., 2-hexyl pyridine; lutidines, e. g., 2,6-lutidene; nonyl pyridines, e. g., 2-(5-nonyl) pyridine and 4-(5-nonyl) pyridine; picolines, e. g., α-picoline, β-picoline and γ-picoline; and collidines.

While all boron halides are satisfactory, boron trifluoride is preferred. The boron compounds are advantageously used either in solution or as a complex, for instance as an etherate complex; 1,4-dioxane, dimethylether, and diethylether, for instance, are suitable ethers.

The chemism on which the process of the invention is based may be illustrated by the following equations in which Py represents a pyridine:

$$2Py + B_2H_6 \rightarrow 2(Py.BH_3)$$

$$2(Py.BH_3) + 2BF_3 \rightarrow B_2H_6 + 2Py.BF_3$$

The separation of the ethane from the technical diborane is best carried out by first distilling the entire mixture and absorbing it in pyridine whereby the diborane is complexed. It is then easy to remove the ethane from the complex Py.BH₃ formed by volatilizing the ethane. Thereafter the diborane is recovered from the complex by reacting it with the boron halide whereby the boron halide takes the place of the diborane and forms a complex with the pyridine while the diborane is freed. The diborane may then be removed from the complex by volatilization.

In the following, an example is given of the process of this invention without the intention to have the invention limited to the details given therein.

Example 300 cc. of technical diborane, which has a vapor pressure of 221 mm., was distilled, and the distillate was passed into a vessel containing an excess of pure anhydrous pyridine; this mixture thus obtained was allowed to stand for several hours. It was then cooled to −80° C., and the volatile ingredients were pumped off. The mixture was brought to room temperature, again cooled to −80° C., and pumping was repeated. By these cycles a total of 50 cc. of ethane was removed.

The pyridine containing the diborane in complexed form was then cooled to a temperature of −23° C. (by immersing the container into a mixture of liquid and solid carbon tetrachloride), and part of the pyridine removed by pumping; thereafter elimination of the remainder of excessive pyridine, that is the pyridine which was not bonded to diborane, was completed by increasing the temperature to 0° C. and maintaining this temperature for about five hours while applying a vacuum. The residue, obtained after all of the nonbonded pyridine was removed, was of slightly yellowish color and proved to be the complex Py.BH₃.

This complex compound was then treated with an excess of boron trifluoride dissolved in 1,4-dioxane; as the boron fluoride was added, the pressure gradually increased. The mixture was allowed to stand for several hours. The fraction of the mixture which was volatile at room temperature, was then removed by pumping and thereupon fractionally condensed by guiding it through a trap held at a temperature of −80° C. The fraction non-condensable at said temperature was found to be pure diborane; at −112° C. it had a vapor pressure of 223 mm.

It will be understood that while there have been given various details of the process of the in-

What is claimed is:

1. The process of recovering diborane from a mixture of diborane and ethane, which comprises contacting said mixture with a pyridine to produce a complex compound of pyridine and diborane, removing the ethane from said complex compound by fractional distillation, and then reacting said complex with a boron halide whereby the diborane is freed.

2. The process of recovering diborane from a mixture of diborane and ethane, which comprises contacting said mixture with a pyridine to produce a complex compound of pyridine and diborane, removing the ethane from said complex compound by fractional distillation, then reacting said complex with a boron halide whereby the diborane is freed, pumping off the ingredients volatile at room temperature, and fractionally condensing parts of said volatile ingredients at $-80°$ C. whereby a distillate consisting of pure diborane is obtained.

3. The process of claim 2 wherein the pyridine is pyridine of the formula $C_5H_5N$ and wherein the boron halide is dissolved in an ether.

4. The process of claim 2 wherein the boron halide is boron trifluoride and the ether is 1,4-dioxane.

5. The process of claim 2 wherein the boron halide used is boron trifluoride dissolved in an ether.

6. The process of claim 5 wherein the ether is 1,4-dioxane.

GEORGE W. SCHAEFFER.
GLEN D. BARBARAS.

No references cited.